(12) United States Patent  
Beust (10) Patent No.: US 7,707,544 B2
(45) Date of Patent: Apr. 27, 2010

(54) SYSTEM AND METHOD FOR GENERATING AND REUSING SOFTWARE APPLICATION CODE WITH SOURCE DEFINITION FILES

(75) Inventor: Cédric Beust, San Francisco, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 78 days.

(21) Appl. No.: 10/310,605

(22) Filed: Dec. 5, 2002

(65) Prior Publication Data

US 2004/0111701 A1      Jun. 10, 2004

(51) Int. Cl.
*G06F 9/44*         (2006.01)
(52) U.S. Cl. .................. 717/106; 717/108; 717/118
(58) Field of Classification Search .......... 717/112, 717/106, 168–178, 104, 107, 100, 102, 108, 717/118, 121
See application file for complete search history.

(56) References Cited

U.S. PATENT DOCUMENTS

| | | | | |
|---|---|---|---|---|
| 5,070,478 A | * | 12/1991 | Abbott | 715/531 |
| 5,079,700 A | * | 1/1992 | Kozoll et al. | 715/531 |
| 5,140,521 A | * | 8/1992 | Kozol et al. | 715/531 |
| 5,339,433 A | * | 8/1994 | Frid-Nielsen | 717/141 |
| 5,485,618 A | * | 1/1996 | Smith | 715/710 |
| 5,513,305 A | * | 4/1996 | Maghbouleh | 715/500 |
| 5,557,730 A | * | 9/1996 | Frid-Nielsen | 715/839 |
| 5,559,942 A | * | 9/1996 | Gough et al. | 715/802 |
| 5,603,021 A | * | 2/1997 | Spencer et al. | 707/4 |
| 5,694,544 A | * | 12/1997 | Tanigawa et al. | 715/753 |
| 5,694,559 A | * | 12/1997 | Hobson et al. | 715/705 |
| 5,734,749 A | * | 3/1998 | Yamada et al. | 382/187 |
| 5,737,608 A | * | 4/1998 | Van De Vanter | 717/112 |
| 5,740,444 A | * | 4/1998 | Frid-Nielsen | 717/102 |
| 5,748,963 A | * | 5/1998 | Orr | 717/131 |
| 5,748,975 A | * | 5/1998 | Van De Vanter | 715/531 |
| 5,752,058 A | * | 5/1998 | Van De Vanter | 715/531 |
| 5,754,737 A | * | 5/1998 | Gipson | 706/11 |
| 5,778,402 A | * | 7/1998 | Gipson | 715/530 |
| 5,802,262 A | * | 9/1998 | Van De Vanter | 714/1 |
| 5,805,889 A | * | 9/1998 | Van De Vanter | 717/107 |
| 5,813,019 A | * | 9/1998 | Van De Vanter | 715/512 |
| 5,822,588 A | * | 10/1998 | Sterling et al. | 717/131 |
| 5,845,300 A | * | 12/1998 | Comer et al. | 715/508 |
| 5,857,212 A | * | 1/1999 | Van De Vanter | 715/519 |
| 5,978,583 A | * | 11/1999 | Ekanadham et al. | 717/106 |
| 6,026,233 A | * | 2/2000 | Shulman et al. | 717/113 |
| 6,053,951 A | * | 4/2000 | McDonald et al. | 717/109 |

(Continued)

OTHER PUBLICATIONS

Enterprise Javabeans Development Using VisualAge for Java, IBM Redbooks, SG24-5429-00, Jun. 1999, pp. 1-423.*

(Continued)

*Primary Examiner*—Van H Nguyen
(74) *Attorney, Agent, or Firm*—Fliesler Meyer LLP (57) ABSTRACT

A system and method for generating code for an Enterprise Java Bean comprising generating at least one output based on a description of at least one Enterprise Java Bean, wherein the description is attended by at least one annotation. A system and method for generating an annotated description of an Enterprise Java Bean based on at least one input, wherein the description can be used to generate the at least one input.

12 Claims, 1 Drawing Sheet

U.S. PATENT DOCUMENTS

| | | | | |
|---|---|---|---|---|
| 6,070,007 | A * | 5/2000 | Simonyi | 717/106 |
| 6,208,339 | B1 * | 3/2001 | Atlas et al. | 715/780 |
| 6,226,785 | B1 * | 5/2001 | Peterson et al. | 717/106 |
| 6,253,370 | B1 * | 6/2001 | Abadi et al. | 717/154 |
| 6,269,373 | B1 * | 7/2001 | Apte et al. | 707/10 |
| 6,289,512 | B1 * | 9/2001 | Edwards et al. | 717/178 |
| 6,298,478 | B1 * | 10/2001 | Nally et al. | 717/170 |
| 6,305,008 | B1 * | 10/2001 | Vaidyanathan et al. | 717/111 |
| 6,308,315 | B1 * | 10/2001 | Dice et al. | 717/106 |
| 6,311,323 | B1 * | 10/2001 | Shulman et al. | 717/111 |
| 6,343,374 | B1 * | 1/2002 | Martin | 717/140 |
| 6,546,554 | B1 * | 4/2003 | Schmidt et al. | 717/176 |
| 6,591,272 | B1 * | 7/2003 | Williams | 707/102 |
| 6,665,861 | B1 * | 12/2003 | Francis et al. | 717/120 |
| 6,684,388 | B1 * | 1/2004 | Gupta et al. | 717/136 |
| 6,817,009 | B2 * | 11/2004 | Flanagan et al. | 717/126 |
| 6,847,981 | B2 * | 1/2005 | Song et al. | 707/104.1 |
| 6,910,128 | B1 * | 6/2005 | Skibbie et al. | 713/170 |
| 6,993,487 | B2 * | 1/2006 | Bluvband | 704/275 |
| 7,051,322 | B2 * | 5/2006 | Rioux | 717/143 |
| 7,080,361 | B2 * | 7/2006 | Aigen | 717/137 |
| 7,130,885 | B2 * | 10/2006 | Chandra et al. | 709/206 |
| 2002/0095655 | A1 * | 7/2002 | Kim et al. | 717/107 |
| 2003/0051236 | A1 * | 3/2003 | Pace et al. | 717/177 |
| 2006/0036448 | A1 * | 2/2006 | Haynie et al. | 705/1 |

OTHER PUBLICATIONS

Factoring Javabeans in the Enterprise, IBM, SG24-5051-00, Dec. 1997, pp. 1-333.*
Client/Server Programming with Java and Corba, second edition, Robert Orfali et al., Chapters 32-34, Jan. 30, 1997.*
Enterprise Javabeans Technology Server Component Modle for Java Platform, Anne Thomas et al, Dec. 1998, pp. 1-24.*
The Business Benefits of EJB and J2EE Technologies over COM+ and Windows DNA, Ed Roman et al., Dec. 1999, pp. 1-14.*
The Technical Benefits of EJB and J2EE Technologies over COM+ and Windows DNA, Ed Roman et al., Dec. 1999, pp. 1-14.*
Software Component Technologies : Javabeans and Activex, G. Pour, Aug. 1998, ISBN 0-8186-8482-8, pp. 375-383.*
Javabeans and the New Event Model, Eric Giguere, Dr. Dobb's Apr. 1997, pp. 1-8.*
"Rational Inline Make Models Spill the Beans," From ENTmag.com: News, Scott, Bekker, Nov. 15, 1999, 1 page.*
Building Javabeans with Rose J, Jeffrey Hamond, Rose, 1999, <URL:http://www-106.ibm.com/developerworks/rational/library/contnent/RationalEdge/roseaerchitect/re_summer1999/pdf>,pp. 35-40.*
Compiling Standard ML to Java Bytecode, Nick Benton et al, ACM, 1998, pp. 129-140.*
Principles of Object-Oreinted Analysis and Design, James Martin, Oct. 29, 1992, Whole Book.*
Developing Enterprise Java Applications with J2EE and UML, Khawar Z. Ahmed et al, Nov. 12, 2001, p. 230-231.*
"The Pan Language-Based Editing System", Robert A. Balance et al, ACM Transactions, Jan. 1992, pp. 96-127.*
"Coherent User Interfaces for Language-Based Editing Systems", Michael Van De Vanter et al., Academic Press, 1996, pp. 19-69.*
"Practical Language-Based Editing for Software Engineers", Michael L. Van De Vanter, Sun MicroSystems Labs, 1995, pp. 251-267.*
"The Cornell Program Synthesizer: A Syntax-Directed Programming Environment", Tim Teitelbaum et al, ACM, Sep. 1981, pp. 563-573.*
"Programming Environments Based on Strucutured Editors: The Mentor Experience", Veronique Donzeau-Gouge et al, pp. 128-140, 1984.*
On the Usefulness of Syntax Directed Editors, Bernard Lang, Advanced Programming Environments, pp. 47-51, 1986.*
Centaur : the System, P. Borras et al, ACM, 1988, pp. 14-24.*
"The PSG System: From Frmal Language Definitions to Interactive Programming Environments", Rolf Bahlke et al, ACM, 1986, pp. 547-576.*
The Gandalf Project, David Notkin, Journal of Systems and Software, 1985, pp. 91-105.*
Automated Code Checker, IBM Tech Disclosure Bull, vol. 36, No. 98, Sep. 1993, pp. 239-240.*
Smalltalk Tokenizer and Backus-Naur Form Parser, IBM Technical Disclosure Bull, vol. 37, No. 12, Dec. 1994, pp. 313-316.*
Cognition-Sensative Design and Under Modeling for Syntax-Directed Editors, Lisa Rubin Neal, ACM, 1987, pp. 99-102.*
Delocalized Plans and Program Comprehension, Stanley Letovsky et al, IEEE, May 1986, pp. 41-49.*
Intelligent Assisntence for Software Construction: A Case Study, Loren G. Terveen at al, IEEE, 1994, pp. 14-21.*
Visual Craft: A Visual Integrated Development Environment, Ahmed F. Hegazi et al, IEEE, 1997, pp. 210-214.*
Visual Programming Environments: Paradigms and Systems, Ephrain P. Glinert, Aug. 1990, pp. 19-32.*
SPD: A Humanized Documentation Technology, E. Glinert, 1990, pp. 115-123.*
Delphi 3 Client/Server Suite—Delphi RAD New Features Shine, James Powell, Windows Magazine, 1997, 2 pages.*
Delphi 3 Proof Pascal Lives, Peter Coffee, Windows Sources, 1997, 2 pages.*
Delphi 3 Delivers Potent Programming, PC Magazine, 1997, 2 pages.*
Borland Delphi Third Times a Charm, Kenn Nesbitt, Databased Web Advisor, 1997, 7 pages.*
Application Development—Programmers Need to Meet More Demands Than Ever These Products Can Help, Windows Magazine, 1997, 2 pages.*
Jar Guide, Sun MicroSystems, printed May 26, 2003, 2 pages.*
Java Archive (JAR) Features, SunMicroSystems, printed May 26, 2003, 2 pages.*
Compiling the Example Program, SunMicroSystems, printed Jun. 13, 2001, 5 pages.*
Java EE Version History (J2EE), Wikipedia, printed Apr. 26, 2008, 3 pages.*
Java: the First 800 Days, SunMicroSystems Inc. pp. 1-139, printed Feb. 2, 2000.*
Client/Server Programming with Java and Corba Second Edition, Robert Orfali et al, Jan. 30, 1997, pp. 931-932.*
BEA Weblogic Server™ "Assembling and Configuring Web Applications," *BEA Systems, Inc.*, Version 7.0, Document Revised: Aug. 20, 2002, 163 pages.
BEA Weblogic Server™ "Programming Weblogic Enterprise JavaBeans," *BEA Systems, Inc.*, Version 7.0, Document Revised: Jun. 28, 2002, 409 pages.
BEA Weblogic Server™ "Developing Weblogic Server Applications," *BEA Systems, Inc.*, Version 7.0, Document Revised: Aug. 20, 2002, 161 pages.
BEA Weblogic Server™ "Weblogic Builder Online Help," *BEA Systems, Inc.*, Version 7.0, Document Date: Jun. 2002, 64 pages.
BEA Weblogic Server™ "Programming Weblogic XML," *BEA Systems, Inc.*, Version 7.0, Document Revised: Jun. 28, 2002, 128 pages.
BEA Weblogic Server™ "Programming Weblogic Web Services," *BEA Systems, Inc.*, Version 7.0, Document Revised: Nov. 6, 2002, 282 pages.

* cited by examiner

SYSTEM AND METHOD FOR GENERATING AND REUSING SOFTWARE APPLICATION CODE WITH SOURCE DEFINITION FILES

CROSS REFERENCES

The following related documents are hereby incorporated by reference in their entirety: BEA WEBLOGIC SERVER®: ASSEMBLING AND CONFIGURING WEB APPLICATIONS (Release 7.0, Jun. 28, 2002); BEA WEBLOGIC SERVER®: PROGRAMMING WEBLOGIC ENTERPRISE JAVABEANS® (Release 7.0, Jun. 28, 2002); BEA WEBLOGIC SERVER®: DEVELOPING WEBLOGIC SERVER APPLICATIONS (Release 7.0, Jun. 28, 2002); BEA WEBLOGIC SERVER®: WEBLOGIC BUILDER ONLINE HELP (Release 7.0, Jun. 28, 2002); BEA WEBLOGIC SERVER®: PROGRAMMING WEBLOGIC XML (Release 7.0, Jun. 28, 2002); BEA WEBLOGIC SERVER®: PROGRAMMING WEBLOGIC WEB SERVICES (Release 7.0, Jun. 28, 2002); BEA WebLogic Server®: Programming WebLogic ENTERPRISE JAVABEANS® (Release 7.0, Jun. 28, 2002).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to the field of automatic code generation, in particular, automatic generation of Enterprise Java™ Bean source code files from an annotated class definition and the reverse.

BACKGROUND

Enterprise Java™ Beans are reusable software components written in the Java™ programming language. An Enterprise Java™ Bean (EJB) is typically declared in a number of separate source files which define various aspects of the EJB, such as its class, interfaces and deployment behavior. Each time a modification is made to one EJB source file, the other associated EJB source files must also be modified accordingly. This activity is cumbersome and error prone, since the changes must be manually propagated to different files. What is needed is a way to generate source files for EJB's with minimal editing and duplication of information.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In one embodiment, instead of having to edit and maintain several EJB files for each EJB (e.g., the bean class, remote and home classes, deployment descriptors, etc.), editing is limited to a single file that contains an annotated description of one or more EJB class definitions. EJB's are declared in the Java™ programming language. The Java™ programming language and run-time environment are available from Sun Microsystems, Inc., of Palo Alto, Calif. The annotated description file is processed in accordance to one embodiment and the EJB files required for deployment on a server are automatically generated. Annotations are directives that contain information needed to create an EJB's source files. In one embodiment, annotations are interspersed between Java™ source code statements. In another embodiment, annotations are embedded in Java™ comments. In yet another embodiment, an annotation is a Javadoc tag. Javadoc is the tool for generating source code documentation in hypertext markup language ("HTML") format from tags embedded in Java™ source code comments. Javadoc is available from Sun Microsystems, Inc. In another embodiment, annotations are provided separately from the description of one or more EJB classes. For example, annotations can be provided in a graphical user interface, a separate file, or created dynamically based on run-time properties a user has associated with an EJB.

In one embodiment, by way of example, annotations can take the form: @ejbgen-name [attribute[=expression]] . . . attribute[=expression]], where items in square brackets are optional arguments. Name can be the type of annotation and the optional attribute=expression list can be comprised of one or more attribute-expression pairs. In one embodiment, attribute is the name of a required or optional parameter associated with an annotation and the optional expression can be, for example, an infix, postfix or prefix expression that evaluates to a constant (e.g., a number or an alpha-numeric string). In another embodiment, an expression's operators can be arithmetic, logical and string-based. For example, the following Java™ code segment has a comment block that contains three annotations:

```
/**
 * @ejbgen:cmp-field column = acct_id
 * @ejbgen:primkey-field
 * @ejbgen:remote-method transaction-attribute = Required
 */
abstract public String getAccountId( );
```

Conventionally, an EJB's abstract accessor methods define container-managed persistence ("CMP") data fields of the same name. For example, in the code segment above, assuming the accessor method getAccountId( ) was an EJB method, a corresponding data field called "accountId" would be defined upon deployment of the EJB. In one embodiment, the annotation "@ejbgen:cmp-field" specifies that the AccountId CMP field will be stored in column named "acct_id" of a database upon deployment of the EJB. The annotation "@ejbgen:primkey-field" indicates that AccountId will be a primary key in the database. Finally, the annotation "@ejbgen:remote-method" specifies that transaction isolation is required for the method getAccountId( ). All three annotations can be considered method annotations since they come before the declaration of a method.

Figure 1:
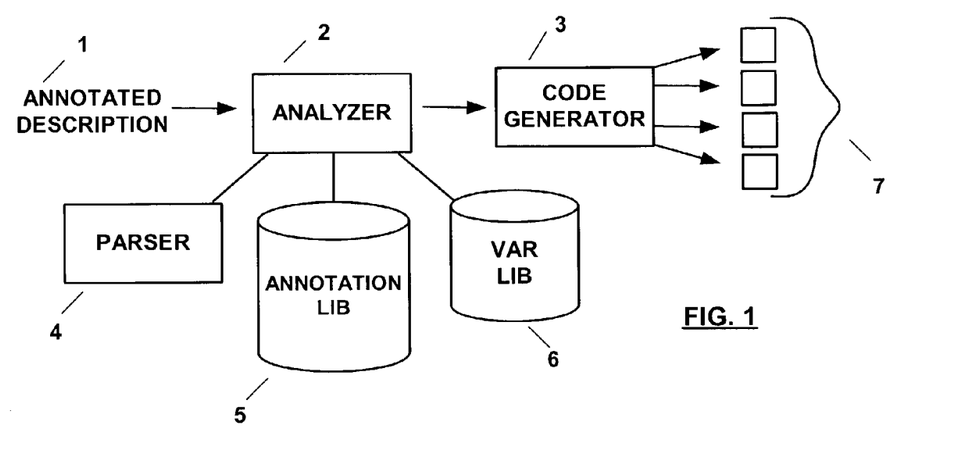
FIG. 1 is a block diagram of an EJB code generation system in accordance to one embodiment of the invention.

FIG. 1 is a block diagram in accordance to one embodiment of the invention. An annotated description 1 is processed by analyzer 2. Annotated description 1 can include one or more EJB definitions. In one embodiment, annotated description 1 can reside in a computer file. In another embodiment, annotated description 1 can reside in a computer memory. In yet a further embodiment, annotated description 1 can be transmitted via a computer network (not shown) to analyzer 2. Analyzer 2 employs parser 4 to divide the Java™ source text in annotated description 1 into discrete units and extract annotations therefrom. Analyzer 2 may perform preprocessing of annotated description 1 before making use of parser 4. In one embodiment, parser 4 can exploit the doclet application programming interface available in Javadoc. The Javadoc doclet interface provides programmatic access to a parsed representation of a Java™ source file. In one embodiment, parser 4 can process the entire annotated description 1 at once. In another embodiment, parser 4 can be employed repeatedly by analyzer 2 to incrementally process annotated description 1. Each annotation is verified by comparing what was found in the annotated description 1 with a formal definition in annotation library 5. In one embodiment, by way of example, annotation library 5 can be a database that includes the definition of each annotation (e.g., its required and optional parameters, permissible values, etc.). In another embodiment, annotation library 5 can be implemented as a cache, tree or any other suitable data structure without departing from the spirit or scope of the present disclosure.

If the annotation and its arguments are proper, analyzer 2 evaluates any attribute-expression arguments provided. The can be done during the validation of each annotation, or in another embodiment, after all annotations have been verified. Values for variable names that occur in expressions are retrieved from variable library 6. In one embodiment, variable library 6 can be implemented in a similar fashion to annotation library 5. In a further embodiment, variable names can be constructed dynamically from expressions using string concatenation operators. In one embodiment, each attribute-expression is evaluated, comparing the value of the expression to permissible values allowed for a given attribute as dictated by annotation library 5. If an expression's value is out of range or erroneous, an error can be declared. In another embodiment, a suitable default value can be provided in place of the errant expression. The form of expressions can be, for example, infix, postfix and prefix. Means for parsing and evaluating such expressions are well known in the art. Based on the parsed annotations, code generator 3 emits the classes or files 7 necessary to deploy the EJB(s) described in annotated description 1.

In one embodiment, annotations can be described in terms of their attributes, their scope (e.g., class or method) and the type of EJB they are applicable to (e.g., message, stateless session, stateful session, entity, etc.). Annotations having class scope come before a class declaration and annotations having method scope come before a method declaration. Annotations can also be adjacent to or associated with other Java™ elements such as fields or variables. In a further embodiment, and by way of illustration, annotations can be defined as in the following tables. The Annotation/Attribute column contains the annotation name in the first row of each table and any associated attribute names in the subsequent rows. The Description column contains a description of the annotation or attribute. The For column indicates whether the annotation is applicable to a class or a method. Finally, the EJB Type column indicates the type of EJB the annotation is applicable to (e.g., session, message, entity, etc.). It will be apparent to those skilled in the art that many such annotations are possible and therefore this illustration is illustrative and should not be construed to be limiting in any respect.

| Annotation/Attribute | Description | For | EJB Type |
|---|---|---|---|
| @ejbgen:automatic-key-generation | Automatically generate database keys for new entity objects. | Class | Entity |
| cache-size | The size of the key cache. (Required) | | |
| Name | The name of the key generator. (Required) | | |
| Type | The type of the key generator. (Required) | | |
| @ejbgen:cmp-field | Specifies a container-managed field. | Method | Entity |
| Column | The column where this CMP field will be mapped. (Required) | | |
| column-type | (OracleClob|OracleBlob) The type of this column. | | |
| group-names | The names of the groups this field belongs to, separated by commas. | | |
| ordering-number | (0..n) The number where this field must appear in signatures and constructors. For this ordering to work, all CMR and CMP fields must have this attribute to a distinct numeric value. | | |
| @ejbgen:cmr-field | Specifies a container-managed relationship. | Method | Entity |
| group-names | The names of the groups this field belongs to separated by commas. | | |
| ordering-number | (0..n) The number where this field must appear in signatures and constructors. For this ordering to work, all CMR and CMP fields must have this attribute to a distinct numeric value. | | |
| @ejbgen:create-default-rdbms-tables | Automatically create required database tables. | Class | Entity |
| @ejbgen:ejb-client-jar file-name | Specify the name of the jar file to generate. The name of the client jar to generate. If more than one EJB's have this tag, only one of the specified jar files will be included in the deployment descriptor. (Required) | Class | All |
| @ejbgen:ejb-local-ref | Declare a reference to an EJB that is in the same container and EJB JAR file. | Class | All |
| Home | Logal class of the bean. | | |
| jndi-name | The JNDI name of the reference. | | |
| Link | Link of the bean. | | |

-continued

| Annotation/Attribute | Description | For | EJB Type |
|---|---|---|---|
| Local | Home class of the bean. | | |
| Name | Name of the reference. | | |
| Type | (Entity\|Session) | | |
| @ejbgen:ejb-ref | Define a reference to another EJB within the Java ™ Naming and Directory Interface ("JNDI") Environment Naming Context ("ENC"). | Class | All |
| Home | Home class of the bean. | | |
| jndi-name | The JNDI name of the reference. | | |
| Link | Link of the bean. | | |
| Name | Name of the reference. | | |
| Remote | Remote class of the bean. | | |
| Type | (Entity\|Session) | | |
| @ejbgen:entity | Declare an entity bean. | Class | Entity |
| ejb-name | The name of this Entity bean. (Required) | | |
| prim-key-class | The Java ™ class of the primary key. In case of a compound primary key, this class will be generated. (Required) Sometimes, a simple (e.g. java.lang.String) primary key class will not be enough to identify an EJB uniquely. In such a case, a primary key is needed. A primary key is a custom Java class containing several fields. All of the fields together identify an EJB uniquely. There are certain constraints associated with the compound primary key class (e.g it must be Serializable, implement hashCode( ), equals( ), etc.). A compound primary key class can contain fields that form a subset of the CMP fields of the EJB. In order to define a compound primary key class: Annotate each CMP field that should be part of the primary key class with @primkey-field. | | |
| abstract-schema-name | The abstract schema name for this EJB. If not specified, the ejb-name value will be used. | | |
| cache-between-transactions | (True\|False) Whether to cache the persistent data of an entity bean across (between) transactions. | | |
| check-exists-on-method | (True\|False) Whether the container checks for the existence of a bean for each method call. | | |
| concurrency-strategy | (Read Only\|Exclusive\|Database) Defines the concurrency strategy for this bean. | | |
| data-source-name | The name of the data source (as it was declared in config.xml). | | |
| database-type | The type of the database. | | |
| db-is-shared | (True\|False) Whether the database is shared. | | |
| default-transaction | The transaction attribute to be applied to all methods that do not have a more specific transaction attribute setting. | | |
| delay-database-insert-until | (ejb Create\|ejbPost Create) | | |
| delay-updates-until-end-of-tx | (True\|False) Whether updates will be sent after the transaction has committed. | | |
| enable-dynamic-queries | (True\|False) Whether dynamic queries are enabled. | | |
| finders-load-bean | (True\|False) If this is set to True, the beans will immediately be loaded into the cache by the finder. | | |
| home-call-router-class-name | Class to be used for routing home method calls. | | |
| home-is-clusterable | (True\|False) Whether this bean can be deployed from multiple servers in a cluster. | | |
| home-load-algorithm | (Round\|Robin\|Random\|WeightBased) The algorithm to use for load-balancing between replicas of this home. | | |
| idle-timeout-seconds | Maximum duration an EJB should stay in the cache. | | |
| invalidation-target | The ejb-name of a read-only Entity bean that should be invalidated when this Container-Managed Persistence Entity EJB has been modified. | | |
| max-beans-in-cache | The maximum number of beans in the cache. | | |
| Optimistic-column | The column that holds the time stamp for optimistic concurrency | | |
| persistence-type | (cmp\|bmp) The type of this Entity bean (default: cmp) | | |
| prim-key-class-nogen | (True\|False). If this keyword is specified, EJBGen will not generate the primary key class. | | |
| read-timeout-seconds | The number of seconds between each ejbLoad( ) call on a Read-Only Entity bean. | | |

-continued

| Annotation/Attribute | Description | For | EJB Type |
|---|---|---|---|
| reentrant | (True\|False) Whether the class methods are reentrant. | | |
| run-as | Specifies the role-name for this EJB. | | |
| run-as identity-principal | The name of the principal in case the role maps to several principals. | | |
| table-name | The name of the table this Entity bean is mapped to. | | |
| trans-timeout-seconds | The transaction timeout (in seconds). | | |
| use-caller-identity | (True\|False) Whether this EJB uses caller's identity. | | |
| verify-columns | (Read\|Modified\|Version\|Timestamp) How optimistic concurrency verifies that the columns modified during the transactions have not been modified. | | |
| @ejbgen:env-entry | Declare an environment entry to be made available through JNDI ENC. | Class | All |
| Name | The name of this environment entry. (Required) | | |
| Type | The Java type for this environment entry (must be fully qualified, even if java.lang). (Required) | | |
| Value | The value for this environment entry. (Required) | | |
| @ejbgen:file-generation | Control which files are generated. | Class | All |
| local-class | (True\|False) Whether to generate the local interface for this EJB. | | |
| local-home | (True\|False) Whether to generate the local home interface for this EJB. | | |
| pk-class | (True\|False) Whether to generate the primary key class for this EJB. | | |
| remote-class | (True\|False) Whether to generate the remote interface for this EJB. | | |
| remote-home | (True\|False) Whether to generate the remote home interface for this EJB. | | |
| value-class | (True\|False) Whether to generate the value class for this EJB | | |
| @ejbgen:finder | Specify finder method attributes. | Class | Entity |
| caching-name | The name of an eager relationship caching. | | |
| ejb-ql | The EJB QL request as it will appear in the deployment descriptor. | | |
| group-name | Name of the group for the WebLogic query | | |
| include-updates | (True\|False) Whether updates made during the current transaction must be reflected in the result of a query. | | |
| isolation-level | The type of transaction isolation for this method. | | |
| max-elements | The maximum number of elements that should be returned by a multi-valued query. | | |
| Signature | It must match exactly the signature generated on the Home class. | | |
| sql-select-distinct | (True\|False) Whether the generated SQL 'SELECT' will contain a 'DISTINCT' qualifier. | | |
| transaction-attribute | The transaction attribute for this local method. If not specified, the default transaction attribute will be used. Methods with this tag will be generated on the Local class. | | |
| Weblogic-ejb-ql | The Weblogic EJB QL request as it will appear in the deployment descriptor. | | |
| @ejbgen:foreign jms-provider | Specify the provider of a Java ™ Message Service ("JMS") | Class | Message-Driven |
| connection-factory-jndi-name | The connection factory JNDI name. (Required) | | |
| initial context-factory | The initial JNDI context factory. (Required) | | |
| provider-url | The provider URL. (Required) | | |
| @ejbgen:isolation-level pattern | Specify transaction isolation level in the server. | Class | All |
| isolation-level | The isolation level for the methods specified in the pattern tag. (Required) | | |
| Pattern | The pattern that matches all methods that will receive this isolation level (e.g. "*"). (Required) | | |
| @ejbgen:jndi-name | Specify the JNDI name of this bean. | Class | All |
| Local | The local JNDI name of this EJB. If not specified, local interfaces will not be generated. | | |
| Remote | The remote JNDI name of this EJB. If not specified, remote interfaces will not be generated. | | |
| @ejbgen:local-home method | Specify attributes of this local home method. | Method | Entity, Session |
| Roles | Comma-separated list of roles that are allowed to invoke this method. | | |

-continued

| Annotation/Attribute | Description | For | EJB Type |
|---|---|---|---|
| transaction-attribute | The transaction attribute for this local method. If not specified, the default transaction attribute will be used. Methods with this tag will be generated on the Local class. | | |
| @ejbgen:local-method | Specify attributes of this local method. | Method | Entity, Session |
| isolation-level | The type of transaction isolation for this method. | | |
| Roles | Comma-separated list of roles that are allowed to invoke this method. | | |
| transaction-attribute | The transaction attribute for this local method. If not specified, the default transaction attribute will be used. Methods with this tag will be generated on the Local class. | | |
| @ejbgen:message-driven | Declare a message-driven EJB. | Class | Message-Driven |
| destination-jndi-name | The JNDI name of the destination. (Required) | | |
| ejb-name | The name of this Message-Driven bean. (Required) | | |
| acknowledge-mode | (auto-acknowledge-ok-acknowledge) The acknowledgement mode. | | |
| default-transaction | The transaction attribute to be applied to all methods that do not have a more specific transaction attribute setting. | | |
| destination-type | (javax.jms.Queue|javax.jms.Topic). | | |
| initial-beans-in-free-pool | The initial number of beans in the free pool. | | |
| max-beans-in-free-pool | The maximum number of beans in the free pool. | | |
| message-selector | The JMS message selector. | | |
| run-as | Specifies the role-name for this EJB. | | |
| run-as-identity-principal | The name of the principal in case the role maps to several principals. | | |
| trans-timeout-seconds | The transaction timeout (in seconds). | | |
| transaction-type | (Bean|Container) Who manages the transactions for this EJB. | | |
| use-caller-identity | (True|False) Whether this EJB uses caller's identity. | | |
| @ejbgen:method-permission-pattern | Specify a permission pattern for this class. | Class | All |
| Pattern | The pattern that matches all methods that will receive this method permission (e.g. "*"). | | |
| Roles | The roles for the methods specified in the pattern tag. Separated by a comma. | | |
| @ejbgen:primkey-field | Specify the primary key field for an entity bean. | Method | Entity |
| @ejbgen:relation | Specify an entity bean relationship. Unidirectional relationships are achieved by specifying only the first three parameters (i.e, no cmr-field, no fk-column, no joint-table). | Class | Entity |
| multiplicity | Many to many relationships must specify an extra table ("joint-table") which must contain at least two columns. The names of these columns must match the names of the columns containing the foreign keys of the two EJB's being joined. (one|many) Specifies the multiplicity of the relationship. (Required) | | |
| Name | The name of the relationship. Use the same name on both ends of a relationship for the roles to be generated properly (note that this constraint applies to unidirectional as well). (Required) | | |
| target-ejb | The EJB name of the target of this relationship. (Required) | | |
| cascade-delete | (True|False) | | |
| cmr-field | The CMR field where this relationship will be kept. If it not specified, the relationship is unidirectional. If specified, the attribute fk-column must be specified as well. | | |
| db-cascade-delete | (True|False) Whether a cascade delete will use the built-in cascade delete facilities of the underlying database. | | |
| fk-column | Only needed in a relationship having at least one side. In that case, the non-one side EJB must declare a column that it will use to store the primary key of its counterpart. | | |
| joint-table | Only needed in a Many-Many relationship. It must be the name of an existing table that will be used to hold the joint table containing the relationships. If using a compound primary key, specify a set of corresponding foreign keys separated by commas. | | |

-continued

| Annotation/Attribute | Description | For | EJB Type |
|---|---|---|---|
| role-name | The name of this role (such as "ParentHasChildren"). If no role name is given, will generate one. | | |
| @ejbgen:relationship-caching-element | Specify cache information for relationship. | Class | Entity |
| caching-name | The name of an eager relationship cashing. (Required) | | |
| cmr-field | The name of the CMR field. (Required) | | |
| group-name | The name of the group to be loaded for the CMR field. | | |
| @ejbgen:remote-home-method | Specify roles allowed to invoke this home method. The method name must start with "ejbHome". Note: Home Methods do not apply to message EJB's Beans. The "throws RemoteException" in the EJB class will be automatically generated in the home class. | Method | Entity, Session |
| Roles | Comma-separated list of roles that are allowed to invoke this method. | | |
| transaction-attribute | The transaction attribute for this remote method. If not specified, the default transaction attribute will be used. Methods with this tag will be generated on the Remote class. | | |
| @ejbgen:remote-method | Specify a method available in a remote interface. | Method | Entity, Session |
| isolation-level | The type of transaction isolation for this method. | | |
| Roles | Comma-separated list of roles that are allowed to invoke this method. | | |
| transaction-attribute | The transaction attribute for this remote method. If not specified, the default transaction attribute will be used. Methods with this tag will be generated on the Remote class. | | |
| @ejbgen:resource-env-ref | Specify the name of a resource environment reference. (Required) | Class | All |
| Name | Name of the resource environment reference. (Required) | | |
| Type | Type of the environment resource references (e.g. javax.jms.Queue). (Required) | | |
| jndi-name | JNDI name of the resource. | | |
| @ejbgen:resource-ref | Specify the JNDI name of a resource. | Class | All |
| Auth | (Application|Container) (Required) | | |
| jndi-name | JNDI name of the resource. (Required) | | |
| Name | Name of the resource. (Required) | | |
| Type | Tyoe of the resource (e.g. javax.sql.DataSource). (Required) | | |
| sharing-scope | (Shareable|Unshareable) | | |
| @ejbgen:role-mapping | Specify roles. | Class | All |
| Principals | The names of the principals in this role (separated by commas). (Required) | | |
| role-name | The name of the role. (Required) | | |
| @ejbgen:select | Specify attributes of select method. | Method | Entity |
| ejb-ql | The EJB-QL defining this select method. Note: the method name must start with ejbSelect. (Required) | | |
| caching-name | The name of an eager relationship caching. | | |
| group-name | Name of the group for the WebLogic query. | | |
| include-updates | (True|False) Whether updates made during the current transaction must be reflected in the result of a query. | | |
| max-elements | The maximum number of elements that should be returned by a multi-valued query. | | |
| result-type-mapping | (Remote|Local) Whether the returned objects are mapped to EJBLocalObject or EJBObject. | | |
| sql-select-distinct | (True|False) Whether the generated SQL 'SELECT' will contain a 'DISTINCT' qualifier. | | |
| Weblogic-ejb-ql | The Weblogic EJB QL request as it will appear in the deployment descriptor. | | |
| @ejbgen:session | Declare a session bean. | Class | Session |
| ejb-name | The name of this Session bean. (Required) | | |
| bean-load-algorithm | The algorithm to use for load-balancing between replicas of this bean. | | |
| call-router-class-name | Class name to be used for routing home method calls | | |
| default-transaction | The transaction attribute to be applied to all methods that do not have a more specific transaction attribute setting. | | |

-continued

| Annotation/Attribute | Description | For | EJB Type |
|---|---|---|---|
| home-call-router-class-name | Class to be used for routing home method calls. | | |
| home-is-clusterable | (True\|False) Whether this bean can be deployed from multiple servers in a cluster. | | |
| home-load-algorithm | (RoundRobin\|Random\|WeightBased) The algorithm to use for load-balancing between replicas of this home. | | |
| idle-timeout-seconds | Maximum duration an EJB should stay in the cache | | |
| initial-beans-in-free-pool | The initial number of beans in the free pool. | | |
| is-clusterable | (True\|False) Whether this bean is cluster-able. | | |
| load-algorithm | (RoundRobin\|Random\|WeightBased) The name of the algorithm used to balance replicas of this home. | | |
| max-beans-in-cache | The maximum number of beans in the cache. | | |
| max-beans-in-free-pool | The maximum number of beans in the free pool. | | |
| methods-are-idempotent | (True\|False) Whether the methods for this stateless session bean are idem potent or not. | | |
| replication-type | (InMemory\|None) How to replicate stateful session beans in a cluster. | | |
| run-as | Specifies the role-name for this EJB. | | |
| run-as-identity-principal | The name of the principal in case the role maps to several principals. | | |
| trans-timeout-seconds | The transaction timeout (in seconds). | | |
| transaction-type | (Bean\|Counter) Who manages the transactions for this EJB. | | |
| Type | (Stateless\|Stateful) The type of the Session bean. If this attribute is not specified, EJBGen will guess the right type by looking at the ejbCreate( ) methods on the class. | | |
| use-caller-identity | (True\|False) Whether this EJB uses caller's identity. | | |
| @ejbgen:value-object | Specify objects to be referenced by the value object class. | Class | All |
| Reference | (Local\|Value) Specify what objects the value object class should reference when accessing other EJB's. (Required) | | |

In one embodiment, by way of example, the following class annotations accompany a Java™ code fragment that declares a stateless session EJB "Trader" having a JNDI name of "ejb20-statelessSession-TraderHome", and an environment variable "tradeLimit" with a default value of 500.

```
/**
 * @ejbgen:session
 *    ejb-name = statelessSession
 *    max-beans-in-free-pool = 100
 *    is-clusterable = false
 *    load-algorithm = Random
 *
 * @ejbgen:jndi-name
 *    remote = ejb20-statelessSession-TraderHome
 *
 * @ejbgen:env-entry
 *    name = tradeLimit
 *    type = java.lang.Integer
 *    value = 500
 *
 */
public class TraderEJB implements SessionBean {
    private static final boolean VERBOSE = true;
    private SessionContext ctx;
    private int tradeLimit;
    ejbCreate( );
    ...
```

The type of session EJB (e.g., stateful or stateless) can be automatically determined. For example, if there is an ejbCreate( ) method having a non-empty parameter list, the EJB is stateful. Otherwise, the EJB is stateless. Two methods associated with this EJB are declared below with method annotations indicating that they are available through a remote interface (i.e., to clients residing outside of the Java™ application server in which this EJB is deployed). Notice that both methods make use of the environment variable "tradeLimit" which was declared in the class annotation.

```
/**
 *  Buys shares of a stock for a named customer.
 *
 *  @ejbgen:remote-method
 */
public TradeResult buy(String stockSymbol, int shares) {
    if (shares > tradeLimit) {
        log("Attempt to buy "+shares+" is greater than limit of
"+tradeLimit);
        shares = tradeLimit;
    }
    log("Buying "+shares+" shares of "+stockSymbol);
    return new TradeResult(shares, stockSymbol);
}
/**
 *  Sells shares of a stock for a named customer.
 *
 *  @ejbgen:remote-method
 *
 */
```

-continued

```
    public TradeResult sell(String stockSymbol, int shares) {
        if (shares > tradeLimit) {
            log("Attempt to sell "+shares+" is greater than limit of
"+tradeLimit);
            shares = tradeLimit;
        }
        log("Selling "+shares+" shares of "+stockSymbol);
        return new TradeResult(shares, stockSymbol);
    }
}
```

The @ejbgen:remote-method annotation indicates that a method will be available in a remote interface. A remote interface declares an EJB's methods that are accessible to applications outside of an EJB's container. Two Java™ files and two deployment descriptors are automatically generated in accordance to an embodiment based on the code fragment above:

| File Name | Contents |
|---|---|
| TraderHome .java Home Interface | import javax.ejb.CreateException; import javax.ejb.EJBHome; import javax.ejb.FinderException; import java.rmi.RemoteException; import java.util.Collection; public interface TraderHome extends EJBHome { public Trader create( )       throws CreateException, RemoteException, CreateException; } |
| Trader.java Remote Interface | import java.rmi.RemoteException; import javax.ejb.EJBObject; public interface Trader extends EJBObject { public TradeResult buy(String stockSymbol, int shares)   throws RemoteException; public TradeResult sell (String stockSymbol, int shares)     throws RemoteException; } |
| ejb-jar.xml EJB Deployment Descriptor | \<ejb-jar\>   \<enterprise-beans\>     \<session\>       \<ejb-name\>statelessSession\</ejb-name\> \<home\>examples.ejb20.basic.statelessSession.TraderHome\</home\> \<remote\>examples.ejb20.basic.statelessSession.Trader\</remote\>       \<ejb-class\>examples.ejb20.basic.statelessSession.TraderEJB\</ejb-class\>         \<session-type\>Stateless\</session-type\>         \<transaction-type\>Container\</transaction-type\>         \<env-entry\>           \<env-entry-name\>INTL\</env-entry-name\>           \<env-entry-type\>java.lang.Double\</env-entry-type\>           \<env-entry-value\>15.0\</env-entry-value\>         \</env-entry\>         \<env-entry\>           \<env-entry-name\>tradeLimit\</env-entry-name\>           \<env-entry-type\>java.lang.Integer\</env-entry-type\>           \<env-entry-value\>500\</env-entry-value\>         \</env-entry\>         \<env-entry\>           \<env-entry-name\>WEBL\</env-entry-name\>           \<env-entry-type\>java.lang.Double\</env-entry-type\>           \<env-entry-value\>10.0\</env-entry-value\>         \</env-entry\>     \</session\>   \</enterprise-beans\> \</ejb-jar\> |
| weblogic-ejb-jar.xml BEA WebLogic Server® Deployment Descriptor | \<?xml version="1.0"?\> \<!DOCTYPE weblogic-ejb-jar PUBLIC "-//BEA Systems, Inc.//DTD WebLogic 6.0.0 EJB//EN" "http://www.bea.com/servers/wls600/dtd/weblogic-ejb-jar.dtd" \> \<weblogic-ejb-jar\>   \<weblogic-enterprise-bean\>     \<ejb-name\>statelessSession\</ejb-name\>     \<stateless-session-descriptor\>       \<pool\>         \<max-beans-in-free-pool\>100\</max-beans-in-free-pool\>       \</pool\>       \<stateless-clustering\>         \<stateless-bean-is-clusterable\>false\</stateless-bean-is-clusterable\>       \</stateless-clustering\>     \</stateless-session-descriptor\>     \<jndi-name\>ejb20-statelessSession-TraderHome\</jndi-name\>   \</weblogic-enterprise-bean\> \</weblogic-ejb-jar\> |

In one embodiment, a value associated with an attribute can be specified with a constant or a variable. In another embodiment, a variable definition can be separate from the EJB definition (e.g., in another file). For example, the variable "remote-jndi-name" can be defined as "Account" as follows:

remote-jndi-name=Account

Within the annotated description, variables can be accessed with the delimiters "${"and"}". For example:

@ejbgen:jndi-name
    remote=${remote-jndi-name}

Thus, "remote" would be equal to "Account".

In another embodiment, variables can be used anywhere after an annotation and can contain whole annotation definitions. Assuming the following variable definition:

jndi-name-tag=remote=RemoteAccount
        local=LocalAccount The following annotation:

@ejbgen:jndi-name
    ${jndi-name-tag} would expand to:

@ejbgen:jndi-name
    remote=RemoteAccount Local=LocalAccount In another embodiment, predefined variables are recognized. Predefined variables have default values that can be overridden. In one embodiment, predefined variables can be defined as follows:

| Variable Name | Description |
|---|---|
| remote.baseClass | The value of this variable will be used as the base class for all generate remote classes. |
| home.baseClass | The value of this variable will be used as the base class for all generated remote home classes. |
| local.baseClass | The value of this variable will be used as the base class for all generated local classes. |
| localHome.baseClass | The value of this variable will be used as the base class for all generated local home classes. |

-continued

| Variable Name | Description |
|---|---|
| value.baseClass | The value of this variable will be used as the base class for all generated value classes. |
| value.package | The value of this variable will be used as the package for all generated value classes. |

In another embodiment, predefined variables can be prefixed with a class name. For example, if the following predefined variables are overridden as follows:
Account.home-baseClass=BaseAccountHome
home.baseClass=BaseHome
value.package=value
containerManaged.value.package=valuePackageFor
   ContainerManaged
Thus, all home interfaces generated will extend the class BaseHome except the home of EJB "Account", which will extend BaseAccountHome.

In another embodiment, EJB annotations can be inherited according to Java™ class inheritance. For example, if an EJB named AccountEJB has a base class BaseAccount:

```
/**
 *    @ejbgen:jndi-name
 *       remote="BaseRemote"
 *    @ejbgen:entity
 *       max-beans-in-cache = 300
 */
public class BaseAccount implements EntityBean {
...
}
/**
 *    @ejbgen:entity
 *       ejb-name = containerManaged
 *       table-name = ejbAccounts
 *       data-source-name = examples-dataSource-demoPool
 *       max-beans-in-cache = 400
 *
 */
public class AccountEJB extends BaseAccount {
...
```

The JNDI remote name "BaseRemote" and max-beans-in-cache of 300 that are defined in the class BaseAccount are inherited by the subclass AccountEJB. The subclass can optionally override these values. For example, the value of max-beans-in-cache is overridden to be 400 instead of 300.

In another embodiment, EJB relations can be inherited if a value for the attribute 'role-name' is specified. All "role-name" attributes in the Java™ inheritance path can be merged. For example, the following parent class defines a partial relation:

```
/**
 *    @ejbgen:relation
 *       name = Many1–Many2
 *       role-name = Many1HasMany2
 *          multiplicity = many * role-name = Many1HasMany2
 *          target-ejb = Many2EJB
 *          fk-column = many2__fk
 *          joint-table = join__table
 */
abstract public class BaseMany1 extends BaseEntityBean {
```

The following subclass inherits the above relation and completes its definition:

```
 *    @ejbgen:relation
 *       role-name = Many1HasMany2
 *       cmr-field = many2
 *
 */
abstract public class Many1EJB extends BaseMany1 {
```

It will be apparent to those skilled in the art that the process of generating EJB source files from an annotated description of an EJB can be performed in reverse. All of the files or classes needed to deploy an EJB can be reduced into a single annotated description of the EJB which can, in accordance to one embodiment, be used in turn to reproduce the EJB source files. Annotations can be generated automatically based information contained in the class definitions, deployment descriptors and relationships between classes.

Figure 2:
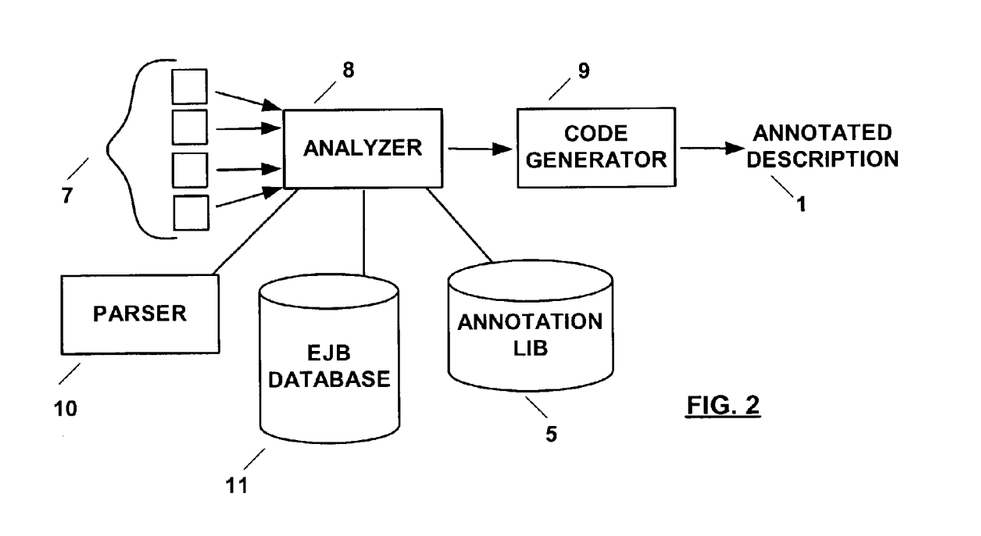
FIG. 2 is a block diagram of a reverse EJB code generation system in accordance to one embodiment of the invention.

FIG. 2 is a block diagram in accordance to one embodiment of the invention. A plurality of input files 7 containing EJB classes and deployment information is processed by analyzer 8. Input files 7 can include one or more EJB class definitions. In one embodiment, input files 7 can reside in a single file, such as a Java™ Archive File ("JAR"). In another embodiment, input files 7 can reside in a computer memory. In yet a further embodiment, input files 7 can be transmitted via a computer network (not shown) to analyzer 8. Analyzer 8 employs parser 10 to extract information related to class structure, class relationships and deployment from input files 7. Analyzer 8 may perform preprocessing of input files 7 before making use of parser 10. In one embodiment, parser 10 can exploit the doclet application programming interface available in Javadoc. In one embodiment, parser 10 can process all input files 7 at once. In another embodiment, parser 10 can be employed repeatedly by analyzer 8 to incrementally process input files 7. During or after parsing, analyzer 8 builds an EJB database 11 containing all of the extracted information pertaining to each EJB represented by input files 7. The EJB database 11 information is then examined to identify which annotation(s) from annotation library 5 adequately describe the EJB's. The these annotations (not shown) along with the EJB database 11 information are provided to code generator 9. Code generator 9 then emits annotated Java™ code 1 to describe the EJB class(es) in input files 7.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method of generating and reusing software application code with source definition files, comprising the steps of:
receiving one or more source definition files, each of which includes annotations therein defining one or a plurality of software objects to be generated, wherein the annotations optionally include variables and values associated therewith for further defining the software object;

parsing the one or more source definition files, including
    comparing the annotations with an annotation library that specifies required and optional parameters for each annotation, to validate the annotations, and
    comparing any provided variables and values with a variables library that specifies permissible values for each variable; and
generating classes for the one or a plurality of software objects in accordance with the validated annotations and provided variables and values, including generating a remote class, a home class, and at least one deployment descriptor based on the description of the one or a plurality of software objects, such that a change to the source definition file is propagated to the remote class, home class and deployment descriptor;
subsequently receiving software application code as input files which include modified class definitions for the one or a plurality of software objects;
examining information in the input files to identify which annotations from the annotation library and the variables library adequately describe the software objects, including
    selecting annotations from the annotation library that adequately match the class structure, class relationships and deployment, and
    determining optional variables and values from the variables library that adequately match the class structure, class relationships and deployment; and
generating a new source definition file which includes the annotations and the optional variables defining the input files.

2. The method of claim 1 wherein the source definition file is used to generate a single ENTERPRISE JAVA BEAN (EJB) file with multiple classes.

3. The method of claim 1 wherein the source definition file can be stored as a computer file and can be edited to modify the annotations therein describing the one or more class definitions.

4. The method of claim 1 wherein during the step of parsing, values are substituted for variables according to information in the variable library.

5. A system for generating and reusing software application code from source definition files, comprising:
    a computer including a graphical user interface for receiving one or more source definition files, each of which includes annotations therein defining one or a plurality of software objects to be generated, wherein the annotations optionally include variables and values associated therewith for further defining the software object;
    an annotation library that specifies required and optional parameters for each annotation;
    a variables library that specifies permissible values for each variable;
    logic for parsing the one or more source definition files, including
        comparing the annotations with the annotation library that specifies required and optional parameters for each annotation, to validate the annotations, and
        comparing any provided variables and values with the variables library that specifies permissible values for each variable;
    logic for generating classes for the one or a plurality of software objects in accordance with the validated annotations and provided variables and values, including generating a remote class, a home class and at least one deployment descriptor based on the description of the one or a plurality of software objects such that a change to the source definition file is propagated to the remote class, home class and deployment descriptor; and
    logic for subsequently receiving software application code as input files which include modified class definitions for the one or a plurality of software objects, and generating a new source definition file defining the input files, including
        examining information in the input files to identify which annotations from the annotation library and the variables library adequately describe the software objects, including
            selecting annotations from the annotation library that adequately match the class structure, class relationships and deployment, and
            determining optional variables and values from the variables library that adequately match the class structure, class relationships and deployment, and
        generating a new source definition file which includes the annotations and the optional variables defining the input files.

6. The system of claim 5 wherein the source definition file is used to generate a single ENTERPRISE JAVA BEAN (EJB) file with multiple classes.

7. The system of claim 5 wherein each source definition file can be stored as a computer file and can be edited to modify the annotations therein describing the one or more class definitions.

8. The system of claim 5 wherein during the step of parsing, values are substituted for variables according to information in the variable library.

9. A computer readable medium, including instructions stored thereon which, when read and executed by a computer, cause the computer to perform the steps comprising:
    receiving one or more source definition files, each of which includes annotations therein defining one or a plurality of software objects to be generated, wherein the annotations optionally include variables and values associated therewith for further defining the software object;
    parsing the one or more source definition files, including
        comparing the annotations with an annotation library that specifies required and optional parameters for each annotation, to validate the annotations, and
        comparing any provided variables and values with a variables library that specifies permissible values for each variable; and
    generating classes for the one or a plurality of software objects in accordance with the validated annotations and provided variables and values, including generating a remote class, a home class and at least one deployment descriptor based on the description of the one or a plurality of software objects such that a change to the source definition file is propagated to the remote class, home class and deployment descriptor;
    subsequently receiving software application code as input files which include modified class definitions for the one or a plurality of software objects;
    examining information in the input files to identify which annotations from the annotation library and the variables library adequately describe the software objects, including
        selecting annotations from the annotation library that adequately match the class structure, class relationships and deployment, and
        determining optional variables and values from the variables library that adequately match the class structure, class relationships and deployment; and generating a new source definition file which includes the annotations and the optional variables defining the input files.

10. The computer readable medium of claim 9 wherein the source definition file is used to generate a single ENTERPRISE JAVA BEAN (EJB) file with multiple classes.

11. The computer readable medium of claim 9 wherein the source definition file can be stored as a computer file and can be edited to modify the annotations therein describing the one or more class definitions.

12. The computer readable medium of claim 9 wherein during the step of parsing, values are substituted for variables according to information in the variable library.

* * * * *

UNITED STATES PATENT AND TRADEMARK OFFICE
CERTIFICATE OF CORRECTION

| | |
|---|---|
| PATENT NO. | : 7,707,544 B2 |
| APPLICATION NO. | : 10/310605 |
| DATED | : April 27, 2010 |
| INVENTOR(S) | : Cedric Beust |

It is certified that error appears in the above-identified patent and that said Letters Patent is hereby corrected as shown below:

On page 2, in column 1, under "Other Publications", line 5, delete "Modle" and insert -- Model --, therefor.

On page 2, in column 1, under "Other Publications", line 23, delete "Object-Oreinted" and insert -- Object-Oriented --, therefor.

On page 2, in column 2, under "Other Publications", line 1, delete "Strucutured" and insert -- Structured --, therefor.

On page 2, in column 2, under "Other Publications", line 7, delete "Frmal" and insert -- Formal --, therefor.

On page 2, in column 2, under "Other Publications", line 10, delete "Journel" and insert -- Journal --, therefor.

On page 2, in column 2, under "Other Publications", line 16, delete "Sensative" and insert -- Sensitive --, therefor.

On page 2, in column 2, under "Other Publications", line 20, delete "Assisntence" and insert -- Assistance --, therefor.

In column 2, line 55, delete "AccountId" and insert -- AccountId --, therefor.

In column 2, line 58, delete "AccountId" and insert -- AccountId --, therefor.

In column 11-12, line 41, delete "Tyoe" and insert -- Type --, therefor.

Signed and Sealed this
Twelfth Day of April, 2011

David J. Kappos
*Director of the United States Patent and Trademark Office*